United States Patent [19]
Grigsby, Jr. et al.

[11] Patent Number: 4,536,522
[45] Date of Patent: Aug. 20, 1985

[54] MANUFACTURE OF POLYOLS AND RIGID POLYURETHANE FOAM USING THIODIALKYLENE GLYCOLS

[75] Inventors: Robert A. Grigsby, Jr., Georgetown; George P. Speranza, Austin; Michael E. Brennan, Austin; Ernest L. Yeakey, Austin, all of Tex.

[73] Assignee: Texaco Inc., White Plains, N.Y.

[21] Appl. No.: 632,167

[22] Filed: Jul. 18, 1984

[51] Int. Cl.$^3$ .................. C08G 18/14; C08G 18/42; C09K 3/00
[52] U.S. Cl. .................. 521/172; 252/182; 521/173; 560/87
[58] Field of Search .................. 528/66; 521/172, 173; 252/182

[56] References Cited

U.S. PATENT DOCUMENTS

| | | | |
|---|---|---|---|
| 2,729,618 | 1/1956 | Mueller et al. | 260/75 |
| 4,048,104 | 9/1977 | Svoboda et al. | 260/2.5 |
| 4,065,410 | 12/1977 | Schaefer et al. | 260/2.5 |
| 4,223,068 | 9/1980 | Carlstrom et al. | 428/310 |
| 4,371,687 | 2/1983 | Robinson | 528/79 |
| 4,373,084 | 2/1983 | Robinson | 528/79 |
| 4,417,001 | 11/1983 | Svoboda et al. | 521/114 |
| 4,469,824 | 9/1984 | Grigsby, Jr. et al. | 521/173 |

*Primary Examiner*—Herbert S. Cockeram
*Attorney, Agent, or Firm*—Jack H. Park; Kenneth R. Priem

[57] ABSTRACT

The present invention is directed to the manufacture of polyols and polyurethanes using thiodialkylene glycols. More particularly, the present invention is directed to the manufacture of rigid polyurethane foam using novel polyols prepared by forming a condensation product of a polyethylene terephthalate with a low molecular weight glycol having a molecular weight of about 500 or less and a thiodialkylene glycol such as thiodiethylene glycol. The present invention is also directed to the use of thiodialkylene glycols as cross linking agents in the preparation of polyurethane foam from condensation products prepared by digesting a polyethylene terephthalate with a polyol having a molecular weight of about 500 or less such as a glycol or a triol.

21 Claims, No Drawings

MANUFACTURE OF POLYOLS AND RIGID POLYURETHANE FOAM USING THIODIALKYLENE GLYCOLS

BACKGROUND OF THE INVENTION

1. Field of the Invention

The present invention relates generally to the preparation of rigid polyurethane foams, including those containing isocyanurate groups, of the type prepared using a condensation product of a polyethylene terephthalate with a low molecular weight polyol such as a glycol. In one aspect of the present invention, a thiodialkylene glycol is used as a raw material in the preparation of the polyethylene terephthalate condensation product to thus provide sulfur containing condensation products. In another aspect of the present invention, a rigid polyurethane foam is prepared from an organic polyisocyanate and the sulfur modified condensation product. In yet another aspect of the present invention, the thiodialkylene glycol is used as a cross linking agent in the preparation of rigid polyurethane foam from an aromatic polyisocyanate and the condensation product of a polyethylene terephthalate with a low molecular weight polyol such as a glycol.

2. Prior Art

Carlstrom et al. U.S. Pat. No. 4,223,068 discloses the manufacture of rigid polyurethane foam from a polyol of the type prepared by digesting a polyalkylene terephthalate with a low molecular weight polyol such as a diol or a triol to provide a condensation product. Among the low molecular weight polyols having a molecular weight of 500 or less disclosed by Carlstrom et al. are materials such as ethylene glycol, propylene glycol, butylene glycol, diethylene glycol, dipropylene glycol, etc.

Svoboda et al. U.S. Pat. No. 4,417,001 discloses the manufacture of polyurethane foams of the isocyanurate type using from 5 to 100% of a condensation product prepared by digesting a polyalkylene terephthalate with a low molecular weight polyol such as diethylene glycol.

Robinson U.S. Pat. No. 4,371,687 is directed to polytetramethylene ether glycols useful in the manufacture of polyurethanes. The polytetramethylene ether glycols are reacted with dihydroxyalkyl sulfides such as $\beta,\beta'$-dihydroxyethyl sulfide in the presence of an acid catalyst such as an alkyl or aryl sulfonic acid (which is preferably a strongly acidic cationic ion exchange resin containing —SO$_3$H groups) to provide a modified polytetramethylene ether glycol reaction product with the dihydroxydialkyl sulfide that has enhanced stability.

Copending U.S. patent application Ser. No. 553,272 filed Nov. 11, 1983, now U.S. Pat. No. 4,469,824 issued Sept. 4, 1984 for Grigsby et al. and entitled "Liquid Terephthalic Ester Polyols" discloses the manufacture of rigid polyurethane foam utilizing as a polyol component a condensation product prepared by digesting a polyethylene terephthalate with a mixture of oxyalkylene glycols, including diethylene glycol.

Robinson U.S. Pat. No. 4,373,084 is directed to polypropylene glycols useful in the manufacture of polyurethanes which are modified by having a thiodialkylene glycol incorporating therein.

SUMMARY OF THE INVENTION

The present invention is directed to the manufacture of polyols and polyurethanes using thiodialkylene glycols. More particularly, the present invention is directed to the manufacture of rigid polyurethane foam using novel polyols prepared by forming a condensation product of a polyethylene terephthalate with a low molecular weight glycol having a molecular weight of about 500 or less and a thiodialkylene glycol such as thiodiethylene glycol. The present invention is also directed to the use of thiodialkylene glycols as cross linking agents in the preparation of polyurethane foam from condensation products prepared by digesting a polyethylene terephthalate with a polyol having a molecular weight of about 500 or less such as a glycol or a triol.

DETAILED DESCRIPTION

The Thiodialkylene Glycol

The thiodialkylene glycols that are used as raw materials in accordance with the present invention are the low molecular weight glycols such as thiodiethylene glycol, thiodipropylene glycol, thiodibutylene glycol, etc. These compounds, also known as B,B'-dihydroxyalkyl sulfides have the structure:

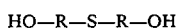

Wherein: R represents a C$_2$–C$_4$ alkylene group.

For example, thiodiethylene glycol has the following structural formula:

Polyester Polyols Modified with Thiodialkylene Glycols

The raw materials utilized in making the thiodialkylene glycol modified polyester polyol include a polyethylene terephthalate polymer, a low molecular weight glycol having a molecular weight of about 500 or less and a thiodialkylene glycol of the class described above.

Although any polyethylene terephthalate may be utilized as a raw material for the present invention, preferred starting materials include residues or wastes from a polyethylene terephthalate manufacturing process and, more preferably, scrap residue from used recycled polyethylene terephthalate. By recycled polyethylene terephthalate (PET) is meant waste or scrap PET that has already been used in another form and discarded.

Generally, the scrap or recycled PET will be a solid and is used in particulate form. For example, soft drink bottles or X-ray film can be fragmentized to provide clear or colored chips. An appropriate raw material for use herein may be prepared by any chopping or pulverizing process which produces particulate solid PET from larger waste recycled articles.

In accordance with a preferred embodiment of the present invention, particulate PET, as described, is digested in a suitable reaction vessel with a glycol or mixture of glycols composed of carbon, hydrogen and oxygen having a molecular weight of about 500 or less at a temperature of about 180°–250° C. such that ethylene glycol formed as a by-product from the digestion process may be removed overhead together with other volatile components such as water, etc. When the digestion is substantially complete, as evidenced by the rate of evolution of overhead products, the reaction mixture is brought to a temperature of about 150° to about 180°

C. and the thiodialkylene glycol is then added to the reaction mixture. The reaction mixture should be maintained within the indicated temperature range for a period of time within the range of about 0.5 to about 5 hours sufficient for at least partial reaction of the thiodialkylene glycol with the digestion product.

In accordance with this embodiment, the thiodialkylene glycol should comprise from about 10 to 90 mole percent and, preferably, from about 20 to about 50 mole percent of the total glycol component reacted with the polyalkylene terephthalate. Although the total glycol component is preferably in molar excess with respect to the polyethylene terephthalate, a polyol product can still be provided even though the polyethylene terephthalate is in molar excess. Thus, from about 0.8 to about 2 mole equivalents of glycol component can be used for each mole equivalent of ethylene terephthalate in the polyethylene terephthalate. However, it is preferable to use from about 1.1 to about 1.5 mole equivalents of glycol component per mole equivalent of ethylene terephthalate.

In accordance with another embodiment of the present invention, the particulate PET is digested with the thiodialkylene glycol. The same digestion conditions can be used, as described above in connection with the preferred embodiment (i.e., temperatures within the range of about 180° to about 250° C., reaction times within the range of about 0.5 to 5 hours, about 0.8 to 2 mole equivalents of thiodialkylene glycol per mole equivalent of ethylene terephthalate in the PET). In accordance with this embodiment the PET is digested with the thiodialkylene glycol alone or in admixture with a glycol such that the digesting component consists of 100 to about 10 mole percent of the thiodialkylene glycol and from 0 to about 90 mole percent of a glycol or a mixture of glycols composed of carbon, hydrogen and oxygen having a molecular weight of about 500 or less. Solid digestion products are normally formed when the PET is digested in this manner. It is therefore necessary to dissolve the digestion product in fluorocarbon and/or another polyol prior to use in the manufacture of polyurethane or polyisocyanurate foam.

Manufacture of Rigid Polyurethanes

Rigid polyurethane foam is prepared from an aromatic isocyanate component, a polyol component, a blowing agent and other reaction ingredients including a catalyst, a surfactant, and other conventional additives such as dyes, fillers, etc.

The Polyol Component

The polyol component to be used in accordance with the present invention may consist of the thiodialkylene glycol modified polyester polyol condensation product described above. In accordance with a preferred embodiment of the present invention, the polyol component comprises a mixture of the thiodialkylene glycol modified polyester condensation product with a conventional polyol free of thiodialkylene groups. Thus, the polyol component may comprise from 100 to about 20 wt. % of the thiodialkylene glycol modified polyester condensation product and, correspondingly, from 0 to about 80 wt. % of a conventional polyol such as a polyether polyol or a propoxylated Mannich condensate of a phenol, formaldehyde and diethanolamine.

The conventional polyol may suitably be a conventional PET-based polyester polyol condensation product of the type, for example, described in Carlstrom et al. U.S. Pat. No. 4,223,068, or in Svoboda et al. U.S. Pat. No. 4,417,001.

The conventional polyol may also suitably be a polyether polyols having a hydroxyl number of about 200 to about 800, and a functionality of about 2 to 8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, diethylene glycol, propylene glycol, dipropylene glycol, glycerine, sorbitol, trimethylol propane, sucrose, methylglucoside, etc.

Such above amines or alcohols may be reacted with an alkylene oxide such as ethylene oxide, propylene oxide or mixed ethylene oxide and propylene oxide using techniques known to those skilled in the art. Thus, for example, the reaction of the alkylene oxide with the initiators of this type is set forth in U.S. Pat. No. 2,948,757 and No. 3,000,963. Essentially, such alkoxylations are carried out in the presence of a basic catalyst at a temperature sufficient to sustain the reaction. The hydroxyl number which is desired for the finished polyol will determine the amount of alkylene oxide used to react with the initiator. As noted above, the polyether polyols useful herein have hydroxyl numbers ranging from about 200 to about 800. The reaction mixture is then neutralized and water and excess reactants are stripped from the polyol.

The polyether polyol may be prepared by reacting the initiator with an alkylene oxide component consisting of propylene oxide and ethylene oxide. One may react the initiator first with propylene oxide followed by ethylene oxide or vice versa in one or more sequences to give so-called block polymer chains or by reacting the initiator once with a mixture of the propylene oxide and the ethylene oxide to achieve a random distribution of such alkylene oxides. The alkylene oxide component should consist of 100 to 80 wt. % of propylene oxide and, correspondingly, from 0 to 20 wt. % of ethylene oxide.

As another example of a conventional polyol useful in accordance with the present invention may be mentioned nitrogen-containing polyether polyols of the type described in U.S. Pat. Nos. 3,297,597 and 4,137,265. Polyols of this type are marketed by Texaco Chemical Company as Thanol ® R-350-X and Thanol ® R-650-X polyols. These polyols are prepared by reacting from 3 to 4 moles of propylene oxide with 1 mole of a Mannich reaction product of phenol or nonylphenol with 1 or 2 moles of diethanolamine and formaldehyde.

Mixtures of two or more such conventional polyols may be used in admixture with the thiodialkylene glycol modified polyester condensation product in preparing the polyol component. Thus, for example, the thiodialkylene glycol modified polyester condensation product may be used in admixture with a conventional PET-based polyester polyol, a polyether polyol, a nitrogen-containing polyether polyol or a mixture of any two or all of the conventional polyols (i.e., a mixture of a PET-based polyester polyol with a nitrogen-containing polyol or a polyether polyol or both.

Typical aromatic polyisocyanates that may be used in the practice of the present invention include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphaticaromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Methylene-bridged polyphenyl polyisocyanate mixtures which have a functionality of from about 2 to about 4 may also be used. These latter isocyanate compounds are generally produced by the phosgenation of corresponding methylene bridged polyphenyl polyamines, which are conventionally produced by the reaction of formaldehyde with a primary aromatic amine, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The methylene-bridged polyphenyl polyisocyanate mixtures used here may contain from about 20 to about 100 wt. % of methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

The aromatic polyisocyanate reacts with the polyol to provide polyurethane linking groups during the foaming reaction. Under certain catalytic reaction conditions the polyisocyanate groups will interreact with each other to provide isocyanurate groups which are also reactive with the polyol. Thus, as is well known in the art, so-called "isocyanurate" foams can be formed which contain a desired percentage of isocyanurate groups by adjusting the mole ratio of aromatic polyisocyanate to polyol and catalytic control of the reaction mixture.

In the production of rigid polyurethane foams in the practice of the invention, other known additives are used. One such constituent is the blowing agent. Water may be used as a blowing agent. All or part of the water may be replaced with an inert blowing agent such as trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

The catalysts which may be used to make the foams are well known. Tertiary amines and organo-metallic compounds are normally preferred.

Examples of suitable tertiary amines, used either individually or in admixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, diethylpiperazine, N-ethylmorpholine, dimethylaniline, nicotine, dimethylaminoethanol, tetramethylpropanediamine, methyltriethylenediamine, etc.

Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc.

Selection of the individual catalysts and proportions to use in the polyurethane reaction are well within the knowledge of those skilled in the art, and an amine and organo-metallic compound are often used together in the polyurethane reaction.

Another conventional ingredient that is usually employed is a foam stabilizer. Foam stabilizers are also known as silicone oils or emulsifiers. The foam stabilizer may be an organic silane or siloxane. For example, compounds may be used having the formula:

$$RSi[O-(R\ SiO)_n-(oxyalkylene)_mR]_3$$

wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, tris(2-chloropropyl)phosphate, bis(dichloropropyl)tribromopentyl phosphate, tetrakis-(2-chloroethyl)ethylene diphosphate (sold by Olin Chemicals as THERMOLIN ®101), FYROL ® EFF (oligomeric chloroalkyl phosphate, sold by Stauffer Chemical Co.), tricresyl phosphate, cresyl diphenyl phosphate, chlorinated paraffins, and brominated paraffins. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 10 to about 50 parts by weight per 100 parts by weight of polyol in the reaction mixture. It is preferred to use from about 10 to about 20 parts by weight.

The rigid polyurethane foams are preferably made in one step by reacting all the ingredients together (the one-shot process).

In accordance with another embodiment of the present invention, the thiodialkylene glycol is not incorporated into the polyester polyol condensation product as described above. Instead, a conventional PET-based polyester polyol condensation product of the type, for example, described in Carlstrom et al. U.S. Pat. No.

4,223,068, or in Svoboda et al. U.S. Pat. No. 4,417,001 is used. In accordance with this embodiment, from about 5 to about 20 wt. % of the thiodialkylene glycol is incorporated into the conventional polyester condensation product polyol at the time the ingredients are mixed together to form the polyurethane foam.

Among the advantages to be obtained by using the thiodialkylene glycols as modifying agents in the manufacture of polyurethane foams are the improved heat distortion temperatures that are generally obtained and improved dimensional stability of the foams.

SPECIFIC EXAMPLES

Below are the experiments in which thiodiethylene glycol was used as a reactant to prepare modified polyols. The experimental conditions for the preparation of Examples 1–7 are listed in Table I.

EXAMPLE 1

Blue polyethylene terephthalate (PET) film chips (80.0 g, 0.42 m) and thiodiethylene glycol (120 g, 0.98 m) were added to 0.25 l three-neck flask equipped with a condenser, a nitrogen inlet, a mechanical stirrer and a thermometer. The contents of the flask was heated to 220° C., with stirring, for two hours. No overhead was removed. Upon cooling, the product was a blue solid with a strong odor associated with the product. The hydroxyl number of the product was determined to be 335. (5773-85)

EXAMPLE 2

Example 2 was completed in a similar manner as Example 1 except that 20 ml of overhead was removed. The hydroxyl number for this product was determined to be 99. A strong odor was associated with this product. (5773-95)

EXAMPLE 3

Example 3 was completed in a similar manner as Example 1 except that diethylene glycol was used as one of the reactants. No overhead was removed from the product. The hydroxyl number for this product was determined to be 507. A strong odor was associated with this product. (5773-100)

EXAMPLE 4

Example 4 was completed in a similar manner as Example 3 except that a polyethylene glycol having an average molecular weight of 200 was used in place of the diethylene glycol. No overhead was removed from the product. The hydroxyl number for this product was determined to be 584. A strong odor was associated with this product. (5788-1)

EXAMPLE 5

Example 5 was completed in a similar manner as Example 3 except a catalyst, tetraisopropyl ortho titanate (1.0 g) and a diproylene glycol blend product (M-103) were also used as reactants. Twenty ml of overhead was removed from the product. The hydroxyl number for this product was determined to be 254. A strong odor was associated with this product. The dipropylene glycol blend, M-103, was obtained from the Arco Chemical Company. It contained about 82.0% dipropylene glycol, 16.8% tripropylene glycol and 1.0% tetrapropylene glycol. (5825-15)

EXAMPLE 6

Example 6 was completed in a similar manner as Example 5 except with a larger portion of thiodiethylene glycol in the reaction mixture. The hydroxyl number for this product was determined to be 269. A strong odor was associated with this product. (5825-19)

EXAMPLE 7

Example 7 was completed in a similar manner as Example 6 except thiodiethylene glycol was added after the overhead was removed and the reaction had cooled to 170° C. The reaction mixture was then heated for one hour at 170° C. The hydroxyl number for this product was determined to be 319. A slight odor was associated with this product. (5825-21)

EXAMPLE 8

Example 8 was completed in a similar manner as Example 7 except thiodiethylene glycol was added after the overhead was removed and the reaction had cooled to 150° C. The reaction mixture was then heated for one hour at 150° C. The hydroxyl number for this product was determined to be 329. A slight odor was associated with this product. (5825-25)

EXAMPLE 9

Example 9 was completed in a similar manner as Example 8 except with a lower percentage of thiodiethylene glycol in the reaction mixture. The hydroxyl number for this product was determined to be 326. A slight odor was associated with this product. (5825-34)

EXAMPLE 10

Example 10 was prepared by adding 3.2 parts of thiodiethylene glycol and 21.1 parts of a polyol, described below, together. The polyol was prepared by reacting PET (500.0 g), diethylene glycol (300.0 g), a dipropylene glycol blend (200.0 g) and tetraisopropylortho titanate (2.0 g) at 230° C. for four hours. During the four hours, 190.0 g of overhead was removed from the product. The polyester polyol was determined to have a hydroxyl number of 237. (5825-32)

Rigid Polyurethane and Polyisocyanurate Foams Incorporating Polyester Extender Polyol Modified with Thiodiethylene Glycol The experimental thiodiethylene glycol polyols were used as extender polyols at the 10-30% level in polyurethane formulations or as the sole polyol in polyisocyanurate formulations. Thiodiethylene glycol was also added to one of the polyols in the polyisocyanurate formulation. The data presented in Table II show that the addition of a polyol, which had been reacted with thiodiethylene glycol, or the addition of thiodiethylene glycol to a polyol, improved the heat distortion temperature of the polyisocyanurate foam.

The other polyols that were used in the polyurethane formulations were products of the Texaco Chemical Company including a polyol sold under the tradename Thanol ® R-350-X, which is a propoxylated Mannich condensate of phenol, formaldehyde and diethanolamine, and Thanol ® R-650-X, which is a propoxylated Mannich condensate of nonylphenol, diethanolamine and formaldehyde. The third polyol that was used was a polyol of the type prepared by digesting polyethylene terephthalate with a glycol to form a condensation product. In this instance, the product that was used, Thanol® 390 was a polyester polyol condensation product prepared by digesting polyethylene terephthalate with diethylene glycol and a mixture of polypropylene glycols. It had a hydroxyl number of 237.

Formulation components were mixed at 2700 rpm and poured into 8"×8"×6" (600 g pour) open molds and allowed to rise. The resulting foams were allowed to stand at room temperature for at least three days before testing. Formulations, reaction profiles and visual observations are listed below.

TABLE I
Synthesis of Polyester Polyols Containing Thiodiethylene Glycol

| Example # | 1 | 2 | 3 | 4 | 5 | 6 | 7 | 8 | 9 |
|---|---|---|---|---|---|---|---|---|---|
| Run # | 5773-85 | 5773-95 | 5773-100 | 5788-1 | 5825-15 | 5825-19 | 5825-21 | 5825-25 | 5825-34 |
| PET | | | | | | | | | |
| Type | B | B | B | B | B | B | B | B | B |
| Grams | 80 | 80 | 80 | 60 | 96 | 192 | 192 | 192 | 192 |
| Moles | 0.42 | 0.42 | 0.42 | 0.31 | 0.5 | 1.0 | 1.0 | 1.0 | 1.0 |
| % | 40 | 40 | 40 | 33 | 50 | 50 | 50 | 50 | 50 |
| Polyol[1] | TDEG | TDEG | TDEG | TDEG | TDEG | TDEG | TDEG | TDEG | TDEG |
| Grams | 120 | 120 | 60 | 60 | 24 | 57.6 | 57.6 | 57.6 | 46.1 |
| Moles | 0.983 | 0.983 | 0.49 | 0.49 | 0.2 | 0.47 | 0.47 | 0.47 | 0.38 |
| % | 60 | 60 | 30 | 33 | 12.5 | 15 | 15 | 15 | 12.0 |
| Other | | | DEG | PEG-200 | DEG | DEG | DEG | DEG | DEG |
| Grams | | | 60 | 60 | 36 | 67.2 | 67.2 | 67.2 | 73 |
| Moles | | | 0.57 | 0.8 | 0.34 | 0.63 | 0.63 | 0.63 | 0.69 |
| % | | | 30 | 33 | 19 | 17.5 | 17.5 | 17.5 | 19.0 |
| Other | | | | | M-103 | M-103 | M-103 | M-103 | M-103 |
| Grams | | | | | 36 | 67.2 | 67.2 | 67.2 | 73 |
| Moles | | | | | 0.36 | 0.47 | 0.47 | 0.47 | 0.51 |
| % | | | | | 19 | 17.5 | 17.5 | 17.5 | 19.0 |
| Note: | | | | | 4 | 4 | 2,4 | 3,4 | 3,4 |
| Rx. Temp. °C. | 220 | 235 | 220 | 220 | 230 | 230 | 230 | 230 | 230 |
| Rx. Time Hrs. | 2 | 2 | 1 | 1 | 2 | 2.5 | 2 | 1 | 2 |
| OH # | 335 | 99 | 507 | 584 | 254 | 269 | 319 | 329 | 326 |
| Distillate ml | 0 | 20 | 0 | 0 | 20 | 40 | 40 | 40 | 40 |
| Appearance When First Made Liquid? | N | N | N | N | Y | Y Creamy | Y Creamy | Y Creamy | Y |
| Appearance After Approx. 2 Months | Solid | Solid | Solid | Solid | Hazy | Creamy | Creamy | Creamy | Liquid |

Notes:
1. TDEG stands for thiodiethylene glycol.
2. TDEG was added after the overhead was taken off. It was added at 170° C. and held for 1 hr.
3. TDEG was added after the overhead was taken off. It was added at 150° C. and held for 1 hr.
4. 1.0 g of tetraisopropyl ortho titanate was added to the reaction mixture prior to heating.

TABLE 2
Rigid Polyurethane and Polyisocyanurate Foams Incorporating Extender Polyol Modified with Thiodiethylene Glycol

| NB - Page No. | 5794-84-1 | -2 | -3 | -4 | -85-1 | -2 | -3 |
|---|---|---|---|---|---|---|---|
| Formulation, pbw | | | | | | | |
| R-350-X (OH = 534) | 25.3 | — | — | — | 24.5 | — | — |
| R-650-X (OH = 451) | — | 27.3 | — | — | — | 26.4 | — |
| 5825-32 (OH = 237) | 10.9 | 11.7 | 30.0 | 21.1 | — | — | — |
| Thiodiethylene glycol | — | — | — | 3.2 | — | — | — |
| 5825-34 (OH = 326) | — | — | — | — | 10.5 | 11.3 | 24.3 |
| Antiblaze 80 | 5.0 | → | → | → | → | → | → |
| Water | 0.2 | → | — | — | 0.2 | → | — |
| Freon R-11 | 12.0 | → | → | → | → | → | → |
| L-5420 | 0.5 | → | — | — | 0.5 | → | — |
| DC-193 | — | — | 0.5 | → | — | — | 0.5 |
| Fomrez UL-32 | 0.01 | → | — | — | 0.01 | → | — |
| T-45 | — | — | 1.5 | → | — | — | 1.5 |
| Mondur MR | 46.1 | 43.3 | 51.0 | 56.7 | 47.3 | 44.6 | 56.7 |
| Index | 1.2 | 1.2 | 3.0 | 3.0 | 1.2 | 1.2 | 3.0 |
| Reaction Profile | | | | | | | |
| Times (sec) mixing | 10 | 8 | 3 | 3 | 10 | 8 | 3 |
| cream | 18 | 17 | 8 | 8 | 18 | 17 | 10 |
| gel | 65 | 61 | 20 | 17 | 63 | 58 | 23 |
| tack free | 86 | 77 | 34 | 19 | 82 | 73 | 25 |
| rise | 152 | 138 | 66 | 51 | 135 | 136 | 55 |
| Initial surface friability | None | → | Yes | → | None | → | Yes |
| Foam appearance | Good | → | → | → | → | → | Fair |
| Physical Properties | | | | | | | |
| Density (lbs/ft$^3$) | 1.93 | 2.05 | 1.93 | 2.06 | 1.93 | 2.18 | 1.83 |
| K-Factor | 0.115 | 0.120 | 0.127 | 0.134 | 0.114 | 0.117 | 0.128 |
| Comp. str (psi), w/rise | 46.59 | 48.78 | 39.27 | 31.64 | 46.89 | 47.53 | 30.28 |
| x/rise | 13.70 | 15.14 | 11.51 | 15.90 | 14.38 | 16.67 | 9.81 |
| Heat distortion (°C.) | 118 | 109 | 166 | 207 | 120 | 115 | 208 |
| % Closed cells | 92.31 | 92.04 | 89.02 | 86.63 | 92.98 | 93.41 | 89.98 |

TABLE 2-continued

Rigid Polyurethane and Polyisocyanurate Foams Incorporating Extender Polyol Modified with Thiodiethylene Glycol

| NB - Page No. | 5794-84-1 | -2 | -3 | -4 | -85-1 | -2 | -3 |
|---|---|---|---|---|---|---|---|
| Friability (% wt. loss, 10 min) | 2.12 | 2.33 | 42.07 | 77.56 | 1.60 | 0.62 | 59.88 |
| ASTM 1692 burn, in/min | 1.64 | 1.47 | 1.64 | 1.58 | 1.76 | 2.39 | 1.34 |
| Butler Chimney Test | | | | | | | |
| Flame height, in. | >11 | >11 | 5.3 | 4.5 | >11 | >11 | 5.3 |
| Secs. to extinguish | 11 | 12.2 | 10.7 | 10.2 | 12.8 | 14 | 10.0 |
| % Wt. retained | 78.6 | 75.1 | 93.6 | 94.7 | 76.0 | 76.9 | 92.5 |
| Dimensional Stability | | | | | | | |
| 158° F., 100% RH, | | | | | | | |
| 1 wk, V | +9.4 | +19.6 | +8.0 | +4.6 | +7.8 | +12.3 | +5.2 |
| L | +6.4 | +11.5 | +5.8 | +2.9 | +5.6 | +10.7 | +3.1 |
| 4 wks, V | +19.8 | +34.9 | +10.8 | +6.1 | +17.6 | +18.8 | +7.4 |
| L | +12.1 | +18.2 | +7.6 | +4.6 | +10.8 | +15.6 | +4.8 |

As the results set forth in Tables I and II show, good quality polyols and good quality polyurethane foam are prepared by the practice of the present invention.

It will also be observed that in order to minimize odor, the thiodialkylene glycol should not be added during the digestion process until the evolution of overhead products is substantially complete. Thus, at least 10 wt. % of the initial charge should be taken overhead before the thiodialkylene glycol is added and, more preferably, from about 15 to about 25 wt. % of the charge is removed overhead before the reaction mixture is cooled and the thiodialkylene glycol is added.

It is also to be observed that the functionality of the polyester polyol condensation products derived from polyethylene glycol can be increased by including from about 1 to 5 wt. %, based on the total reactant charge, of a higher functionality additive such as methyl glucoside, glycerine, triethanolamine, diethanolamine, sorbitol, etc.

Having thus described our invention, what is claimed as our invention is:

1. A process for the preparation of a polyol which comprises the steps of digesting a polyalkylene terephthalate with from about 0.8 to about 2 molecular equivalents, based on the alkylene terephthalate groups in the polyalkylene terephthalate, of a polyol having a molecular weight of about 500 or less at a temperature within the range of about 190° to about 280° C. and a pressure within the range of about 1 to about 40 atmospheres for a period of time within the range of about 0.5 to 5 hours while removing from the reaction product volatile condensation by-products including ethylene glycol and derivatives thereof until at least about 10 wt. % of the charge has been removed overhead, cooling the reaction mixture to a temperature within the range of about 150°–190° C., adding from about 10 to about 90 mole percent, based on the low molecular weight diol, of a thiodialkylene glycol and thereafter maintaining said reaction mixture within said temperature range for a period of time within the range of about 0.5 to about 5 hours to thereby provide a thiodialkylene glycol modified polyester polyol condensation product.

2. A process as in claim 1 wherein the polyalkylene terephthalate is polyethylene terephthalate, wherein the low molecular weight polyol comprises glycols, and wherein the thiodialkylene glycol is thiodiethylene glycol.

3. A process as in claim 2 wherein the condensation reaction is conducted at a temperature within the range of about 210° to about 245° C. and a pressure within the range of about 1 to about 20 atmospheres and wherein the low molecular weight polyol and thiodiethylene glycol are added in amounts sufficient to provide a thiodiethylene glycol modified polyethylene terephthalate condensation product polyol having a hydroxyl number within the range of about 100 to about 500.

4. A process as in claim 3 wherein the reactants are proportioned to provide a hydroxyl number within the range of about 200 to about 400.

5. A product prepared by a process including the steps of digesting a polyalkylene terephthalate with from about 0.8 to about 2 molecular equivalents, based on the ethylene terephthalate groups in the polyethylene terephthalate, of a polyol having a molecular weight of about 500 or less at a temperature within the range of about 190° to about 280° C. and a pressure within the range of about 1 to about 40 atmospheres for a period of time within the range of about 0.5 to 5 hours while removing from the reaction product volatile condensation by-products including ethylene glycol and derivatives thereof until at least about 10 wt. % of the charge has been removed overhead, cooling the reaction mixture to a temperature within the range of about 150°–190° C., adding from about 20 to about 50 mole percent, based on the low molecular weight diol, of a thiodialkylene glycol and thereafter maintaining said reaction mixture within said temperature range for a period of time within the range of about 0.5 to about 5 hours to thereby provide a thiodialkylene glycol modified polyester polyol condensation product.

6. A product as in claim 5 wherein the polyalkylene terephthalate is polyethylene terephthalate, wherein the low molecular weight polyol comprises glycols, and wherein the thiodialkylene glycol is thiodiethylene glycol.

7. A product as in claim 6 wherein the condensation reaction is conducted at a temperature within the range of about 210° to about 245° C. and a pressure within the range of about 1 to about 20 atmospheres and wherein the low molecular weight polyol and thiodiethylene glycol are added in amounts sufficient to provide a thiodiethylene glycol modified polyethylene terephthalate condensation product polyol having a hydroxyl number within the range of about 100 to about 500.

8. A product as in claim 7 wherein the reactants are proportioned to provide a hydroxyl number within the range of about 200 to about 400.

9. A process for the preparation of a rigid polyurethane foam which comprises reacting an excess of an aromatic polyisocyanate with a polyol component in the presence of a blowing agent, a catalyst, and a foam stabilizing agent, said polyol component comprising a thiodialkylene glycol modified polyester polyol condensation product of a polyalkylene terephthalate with a polyol having a molecular weight of about 500 or less, said condensation product having been prepared by digesting a polyalkylene terephthalate with from about 0.8 to about 2 molecular equivalents, based on the ethylene terephthalate groups in the polyethylene terephthalate, of a polyol having a molecular weight of about 500 or less at a temperature within the range of about 190° to about 280° C. and a pressure within the range of about 1 to about 40 atmospheres for a period of time within the range of about 0.5 to 5 hours while removing from the reaction product volatile condensation by-products including ethylene glycol and derivatives thereof until at least about 10 wt. % of the charge has been removed overhead, cooling the reaction mixture to a temperature within the range of about 150°–190° C., adding from about 20 to about 50 mole percent, based on the low molecular weight diol, of a thiodialkylene glycol and thereafter maintaining said reaction mixture within said temperature range for a period of time within the range of about 0.5 to about 5 hours to thereby provide said thiodialkylene glycol modified polyester polyol condensation product.

10. A process as in claim 9 wherein the aromatic isocyanate is reacted with the polyol under conditions to thereby induce the formation of isocyanurate groups.

11. A process as in claim 10 wherein the polyalkylene terephthalate is polyethylene terephthalate, wherein the low molecular weight polyol comprises glycols, and wherein the thiodialkylene glycol is thiodiethylene glycol.

12. A process as in claim 10 wherein the polyol is a polyol prepared by conducting the condensation reaction at a temperature within the range of about 210° to about 245° C. and a pressure within the range of about 1 to about 20 atmospheres and wherein the low molecular weight polyol and thiodiethylene glycol are added in amounts sufficient to provide a thiodiethylene glycol modified polyethylene terephthalate condensation product polyol having a hydroxyl number within the range of about 100 to about 500.

13. A process as in claim 10 wherein the polyol is a polyol prepared by proportioning the reactants to provide a hydroxyl number within the range of about 200 to about 400.

14. A process as in claim 9 wherein the thiodialkylene glycol modified polyol is used in admixture with an unmodified polyol having a functionality of about 2 to 8 and a hydroxyl number in the range between about 200 and 800.

15. A process as in claim 14 wherein the unmodified polyol is a propoxylated Mannich condensate of a phenol or an alkyl substituted phenol with diethanolamine and formaldehyde.

16. A process of preparing a polyurethane which comprises reacting an excess of an aromatic polyisocyanate with a polyol component in the presence of a blowing agent, a catalyst and a foam stabilizer, said polyol component comprising a digestion product of a polyalkylene terephthalate with a digesting component comprising a thiodialkylene glycol, said condensation product having been prepared by digesting the polyalkylene terephthalate with from about 0.8 to about 2 molecular equivalents, based on the alkylene terephthalate groups in the polyalkylene terephthalate, of a glycol having a molecular weight of about 500 or less at a temperature within the range of about 180° to about 250° C. and a pressure within the range of about 1 to about 40 atmospheres for a period of time within the range of about 0.5 to about 5 hours while removing from the reaction product volatile condensation by-products including ethylene glycol and derivatives thereof until at least about 10 wt. % of the charge has been removed overhead, cooling the reaction mixture to a temperature within the range of about 150° to about 190° C., adding from about 10 to about 90 mole percent, based on the low molecular weight diol, of a thiodialkylene glycol and thereafter maintaining said reaction mixture within said temperature range for a period of time within the range of about 0.5 to about 5 hours to thereby provide said thiodialkylene glycol modified polyester polyol condensation product, and wherein the polyol is a polyether polyol.

17. A process as in claim 16 wherein the polyol component comprises from 100 to about 20 wt. % of said digestion product and, correspondingly, 0 to about 80 wt. % of a polyether polyol prepared by alkoxylating an initiator with a functionality of about 2 to 8 with an alkylene oxide component or by propoxylating a Mannich condensate of a phenol, formaldehyde and diethanolamine, said alkylene oxide component consisting of 100 to about 80 wt. % of propylene oxide and, correspondingly, from 0 to about 20 wt. % of ethylene oxide.

18. A process as in claim 17 wherein the polyalkylene terephthalate is polyethylene terephthalate wherein the low molecular weight glycol comprises a mixture of glycols and wherein the thiodialkylene glycol is thiodiethylene glycol.

19. A polyurethane prepared by reacting an excess of an aromatic polyisocyanate with a polyol component in the presence of a blowing agent, a catalyst and a foam stabilizer, said polyol component comprising a digestion product of a polyalkylene terephthalate with a digesting component comprising a thiodialkylene glycol, said digestion product having been prepared by digesting the polyalkylene terephthalate with from about 0.8 to about 2 molecular equivalents, based on the alkylene terephthalate groups in the polyalkylene terephthalate, of a glycol having a molecular weight of about 500 or less at a temperature within the range of about 180° to about 250° C. and a pressure within the range of about 1 to about 40 atmospheres for a period of time within the range of about 0.5 to about 5 hours while removing from the reaction product volatile condensation by-products including ethylene glycol and derivatives thereof until at least about 10 wt. % of the charge has been removed overhead, cooling the reaction mixture to a temperature within the range of about 150° to about 190° C., adding from about 10 to about 90 mole percent, based on the low molecular weight diol, of a thiodialkylene glycol and thereafter maintaining said reaction mixture within said temperature range for a period of time within the range of about 0.5 to about 5 hours to thereby provide a thiodialkylene glycol modified polyester polyol condensation product, and wherein the polyol is a polyether polyol.

20. A polyurethane as in claim 19 wherein the polyol component comprises from 100 to about 20 wt. % of said digestion product and, correspondingly, 0 to about 80 wt. % of a polyether glycol prepared by alkoxylating an initiator with a functionality of about 2 to 8 with an alkylene oxide component or by propoxylating a Mannich condensate of a phenol, formaldehyde and diethanolamine, said alkylene oxide component consisting of 100 to about 80 wt. % of propylene oxide and, correspondingly, from 0 to about 20 wt. % of ethylene oxide.

21. A polyurethane as in claim 20 wherein the polyalkylene terephthalate is polyethylene terephthalate wherein the low molecular weight glycol comprises a mixture of glycols and wherein the thiodialkylene glycol is thiodiethylene glycol.

* * * * *